(12) United States Patent
Cruz et al.

(10) Patent No.: US 8,261,959 B2
(45) Date of Patent: Sep. 11, 2012

(54) FRICTION STIR WELDING SPINDLE DOWNFORCE AND OTHER CONTROL TECHNIQUES, SYSTEMS AND METHODS

(75) Inventors: Marcio Fernando Cruz, Sao Jose dos Campos-SP (BR); Gustavo Freitas, Novo Hamburgo (BR); Hamilton Zanini, Sao Jose dos Campos (BR); Jefferson Adriano da Costa, Novo Hamburgo (BR); Robson Fernando de Oliverira Pereira, Sao Jose dos Campos (BR); Edson Pereira, Novo Hamburgo (BR); Fernando Ferreira Fernandez, Sao Jose dos Campos (BR); Mauricio Andena, Sao Jose dos Campos (BR)

(73) Assignee: Embraer S.A., Sao Jose dos Campos-SP (BR)

( * ) Notice: Subject to any disclaimer, the term of this patent is extended or adjusted under 35 U.S.C. 154(b) by 92 days.

(21) Appl. No.: 12/882,372

(22) Filed: Sep. 15, 2010

(65) Prior Publication Data
US 2011/0079339 A1 Apr. 7, 2011

Related U.S. Application Data

(63) Continuation-in-part of application No. 12/237,856, filed on Sep. 25, 2008, now abandoned.

(51) Int. Cl.
*B23K 20/12* (2006.01)
(52) U.S. Cl. ...... 228/2.1; 228/112.1; 228/102; 228/103; 228/8; 228/9
(58) Field of Classification Search ............... 228/2.1, 228/8, 9, 12, 102, 103, 104, 112.1
See application file for complete search history.

(56) References Cited

U.S. PATENT DOCUMENTS

| 6,299,050 | B1 * | 10/2001 | Okamura et al. | 228/110.1 |
| 6,421,578 | B1 * | 7/2002 | Adams et al. | 700/212 |
| 6,499,649 | B2 | 12/2002 | Sayama et al. | |
| 6,708,867 | B2 * | 3/2004 | Yoshinaga | 228/112.1 |

(Continued)

FOREIGN PATENT DOCUMENTS

JP 3124384 5/1991

(Continued)

OTHER PUBLICATIONS

Search Report issued in related EP Application EP2 168 708 (Mar. 23, 2010).

*Primary Examiner* — Jessica L Ward
*Assistant Examiner* — Kevin E Yoon
(74) *Attorney, Agent, or Firm* — Nixon & Vanderhye P.C.

(57) ABSTRACT

Friction stir welding equipment control force spindle for mounting in an orbital head housing uses a coaxial sensor to measure downforce. Simultaneously, an axial electrical actuator is controlled to dynamically correct the axial tool position during the welding, by a direct axial force system control, in order to maintain controlled downforce according to parameters previously set, based on numerical control. The equipment also sets up, monitors and controls spindle rotation speed, welding speed, acceleration speed and downforce using for example closed loop control functions. A laser system may scan the backing surface before welding and correct original tool path, in order to get an offset tool path. A precision alarm system may provide safe welding while preventing the tool from colliding with the backing surface.

9 Claims, 19 Drawing Sheets

U.S. PATENT DOCUMENTS

| | | |
|---|---|---|
| 6,732,900 B2 | 5/2004 | Hansen et al. |
| 6,874,672 B2 * | 4/2005 | Inagaki et al. ............. 228/112.1 |
| 7,121,451 B2 | 10/2006 | Kano et al. |
| 2002/0149331 A1 | 10/2002 | Marcinkiewicz |
| 2003/0029903 A1 | 2/2003 | Kashiki et al. |
| 2005/0006441 A1 | 1/2005 | Adams et al. |
| 2007/0267462 A1 | 11/2007 | Burton et al. |

FOREIGN PATENT DOCUMENTS

| | | |
|---|---|---|
| WO | WO0002704 | 1/2000 |

* cited by examiner

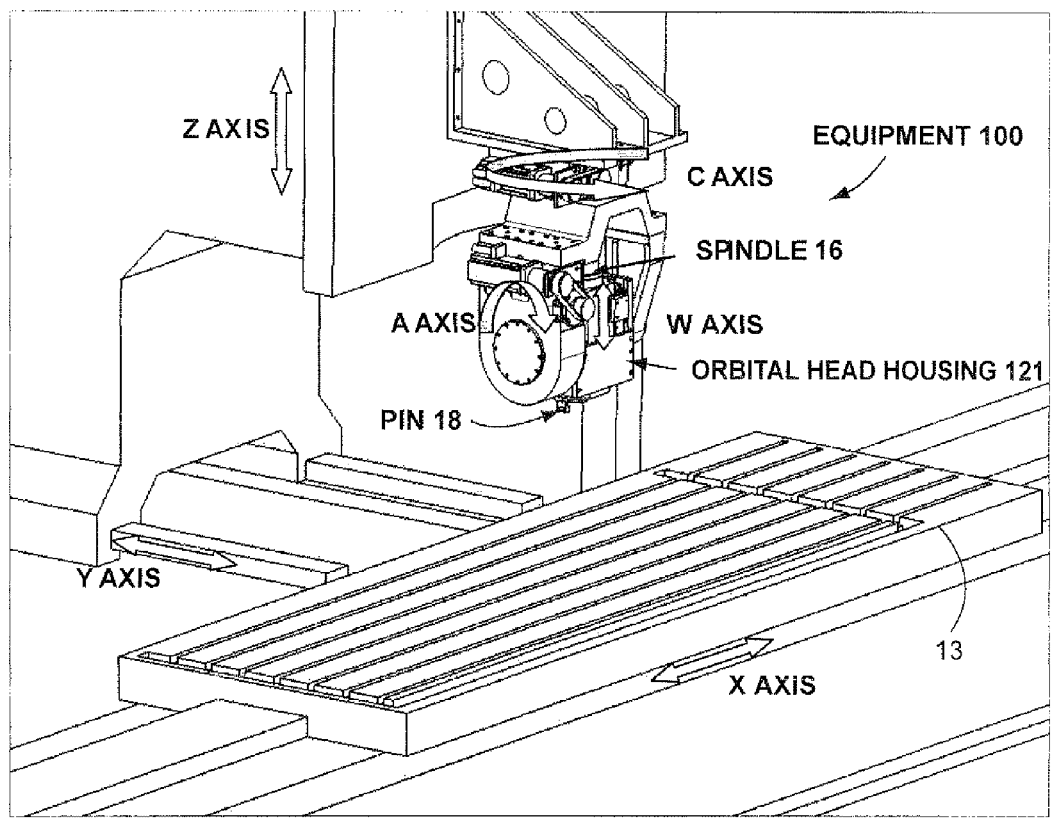
FIG. 1A
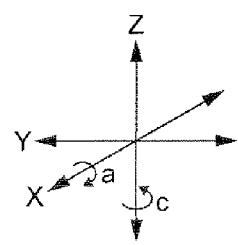

FRICTION STIR WELDING SPINDLE DOWNFORCE AND OTHER CONTROL TECHNIQUES, SYSTEMS AND METHODS

CROSS-REFERENCES TO RELATED APPLICATIONS

This application is a continuation-in-part of application Ser. No. 12/237,856 filed Sep. 25, 2008, entitled "Friction Stir Welding Spindle Downforce and Other Control Techniques Systems and Methods," pending.

STATEMENT REGARDING FEDERALLY SPONSORED RESEARCH OR DEVELOPMENT

FIELD

The technology herein generally relates to friction stir welding, and more specifically to a collection of techniques for controlling the force, axial position and other parameters of a spindle used for friction stir welding which is installed in an orbital head housing. Still more specifically, the technology herein relates to an axial force system that monitors and controls the downforce of a friction stir welding spindle by correcting axial tool position, e.g., according to numerical control parameters. The technology herein also includes a welding safety system that uses laser sensing to avoid tooling collision, and to other friction stir welding spindle control techniques.

BACKGROUND AND SUMMARY

Most people think of welding as requiring a torch or arc that is hot enough to melt the materials being welded. However, a known conventional kind of welding called friction stir welding (FSW) is a solid-state joining process that can join materials without melting them. It is commonly used for applications where it is helpful that the original material characteristics remain largely unchanged. Friction stir welding can be used to weld aluminum, magnesium, copper, titanium, steel, and some plastics.

To accomplish friction stir welding, a specially designed rotating tool heats up and mixes the interface portions where two parts meet. This heating and mixing of the materials in solid state joins the parts without causing them to melt. The rotating tool is typically in the shape of a pin mounted on a rotating spindle. The tool has a shoulder that doesn't penetrate into the material to be welded, but rotates over it. This rotation generates friction and consequently thermal energy that softens the material to be welded. The stirring then joins the two parts on a molecular level so the two parts essentially become one.

FSW provides a number of potential advantages over conventional fusion-welding processes such as for example:

Good mechanical properties of the welded workpiece without need to melt the workpieces;
Improved safety due to the absence of toxic fumes or the spatter of molten material;
Welding patterns are easily automated on relatively simple milling machines;
Can operate in all positions (horizontal, vertical, etc);
Generally good weld appearance and minimal thickness under/over-matching, thus reducing the need for expensive machining after welding;
Low environmental impact;
Other.

During friction stir welding, a number of forces will act on the rotating tool. For example, a downwards force is used to maintain the position of the tool at or below the material surface. A traversal force acts parallel to the tool's motion. A lateral force may act perpendicular to the tool traverse direction. A torque is used to rotate the tool. How much torque is used will depend on the downforce and the friction coefficient (sliding friction) and/or the flow strength of the material in the surrounding region (sticking friction).

In many cases, the vertical position of the tool is preset and so the load will vary during welding. However, friction stir welding machines that automatically control some or all of these various forces to provide constant downforce have certain advantages. For example, example friction stir welding equipment may include actuators and sensors that are able to automatically control the position, orientation and motion of the tool. Some example friction stir welding systems include various sensors such as load cells, pressure sensors and displacement sensors that sense the position of the tool and the amount of force the tool is applying. A control system can be used to control tool position and downforce in response to these sensed parameters.

In order to prevent tool fracture and to minimize excessive tool wear, it is generally desirable to control the welding operation so that the forces acting on the tool are as low as possible and sudden changes are avoided. Conditions that favor low forces (e.g. high heat input, low travel speeds) may however be undesirable from the point of view of productivity and weld properties. While constant downforce is a desirable design goal, because of the many factors involved it can be difficult to achieve. Complete safety from the tool colliding with the backing surface is often not possible due to slight warpage or other distance variations of the backing relative to the tool. Thus, further improvements are possible and desirable.

Certain example non-limiting technology herein provides friction stir welding equipment and methods, developed according to requirements of high reliability, robustness, precision and low cost, in order e.g., to weld lap and butt joints in complex surfaces with fixed or substantially constant pin tool control force.

Exemplary illustrative non-limiting equipment comprises a control force spindle mounted in an orbital head housing. A coaxial sensor measures downforce. Simultaneously, an axial electrical actuator is controlled to dynamically correct the axial tool position during the welding, by a direct axial force system control, in order to maintain controlled downforce according to parameters previously set, based on numerical control. The equipment also sets up, monitors and controls spindle rotation speed, welding speed, acceleration speed and downforce using for example closed loop control functions. The exemplary illustrative non-limiting implementation may also record in a database the downforce and tool welding position during welding.

In addition, exemplary illustrative non-limiting equipment comprises a laser system that scans the backing surface before welding and corrects original tool path, in order to get an offset tool path. A precision alarm system provides safe welding while preventing the tool from colliding with the backing surface.

An example non-limiting method of performing friction stirred welding comprises:
(a) measuring the downforce that a rotating friction stirred welding tool applies to a workpiece; and (b) controlling an electrically controlled actuator based on numeric control while correcting axial tool position at least in part in response to said measured downforce to thereby maintain the load between tolerance limits, said controlling including avoiding oscillations of the load applied to the workpiece by applying proportional integral derivative control to maintain the load constant or substantially constant during welding.

The method can further include measuring variations in axial distance between the tool and the workpiece. The method can further include measuring variations in axial distance between a spindle into which the tool is mounted and a backing onto which the workpiece is placed, and using said measured variations to correct axial tool position and avoid collision between said tool and the backing. The method can further include generating an alarm if the axial distance between the tool and the backing is less than a predetermined threshold distance determined based at least in part on said measured variations. The method can further include logging welding parameters during welding. The method can further include controlling rate of rotation of said tool using a closed loop control process.

The exemplary illustrative technology herein further provides a friction stirred welding system of the type including a spindle mounted in a orbital head housing, said spindle having a rotating tool mounted therein, said tool rotating in contact with a workpiece, the axial position of said tool being determined by an electrically controlled actuator. The system may comprise a sensor that measures the downforce the rotating tool applies to said workpiece. The system may further comprise a control system coupled to said sensor, said control system being structured to control said electrically controlled actuator to correct axial tool position at least in part in response to said measured downforce to thereby maintain the load between tolerance limits, said control system being further structured to avoid oscillations of the load applied to the workpiece by applying proportional integral derivative control to maintain the load constant or substantially constant during welding.

The system may further include a laser sensor that is adapted to be accepted by the spindle and interchangeable with said the rotating tool, said laser sensor measuring variations in axial distance between the rotating tool and the backing surface.

The system may further include a laser sensor that is adapted to be accepted by the spindle and interchangeable with the rotating tool, said laser sensor structured to measure variations in axial distance between the spindle into which the tool is mounted and a backing surface onto which the workpiece is placed, and said control system using said measured variations to correct axial tool position and avoid collision between said tool and the backing.

The system may further include an alarm that indicates if the axial distance between the tool and the backing is less than a predetermined threshold distance determined based at least in part on said measured variations.

The system may further include a data logger that logs welding parameters during welding.

The system may further include a closed loop control arrangement that controls rate of rotation of said tool.

The exemplary illustrative non-limiting technology herein further provides a method of performing friction stirred welding comprising: (a) inserting a sensor into a friction stirred welding spindle; (b) using the sensor to map the axial distance the friction stirred welding spindle is disposed from a backing surface; (c) removing said sensor from said spindle and inserting a tool in its place; (d) rotating said tool; (e) moving said rotating tool into contact with a workpiece placed on said backing surface; and (f) using said map to control an electrically controlled actuator to correct axial tool position relative to said workpiece, wherein said rotating tool in contact with said workpiece plasticizes portions of said workpiece while keeping said workpiece in the solid state, thereby welding said workpiece.

The method may further avoid oscillations of the load applied to the workpiece by applying proportional integral derivative control to maintain downforce of said tool constant or substantially constant during welding.

The method may measure variations in axial distance between a spindle into which the tool is mounted and a backing onto which the workpiece is placed, and using said measured variations to correct axial tool position and avoid collision between said tool and the backing.

The method may generate an alarm if the axial distance between the tool and the backing is less than a predetermined threshold distance determined based at least in part on said measured variations.

The method may automatically log welding parameters during welding.

The method may control rate of rotation of said tool using a closed loop control process.

BRIEF DESCRIPTION OF THE DRAWINGS

These and other features and advantages will be better and more completely understood by referring to the following detailed description of exemplary non-limiting illustrative embodiments in conjunction with the drawings of which:

FIG. 1A shows an exemplary illustrative non-limiting friction stir welding equipment that comprises a spindle mounted in an orbital head housing and a structure that supports said head housing;

DETAILED DESCRIPTION

Figure 1:
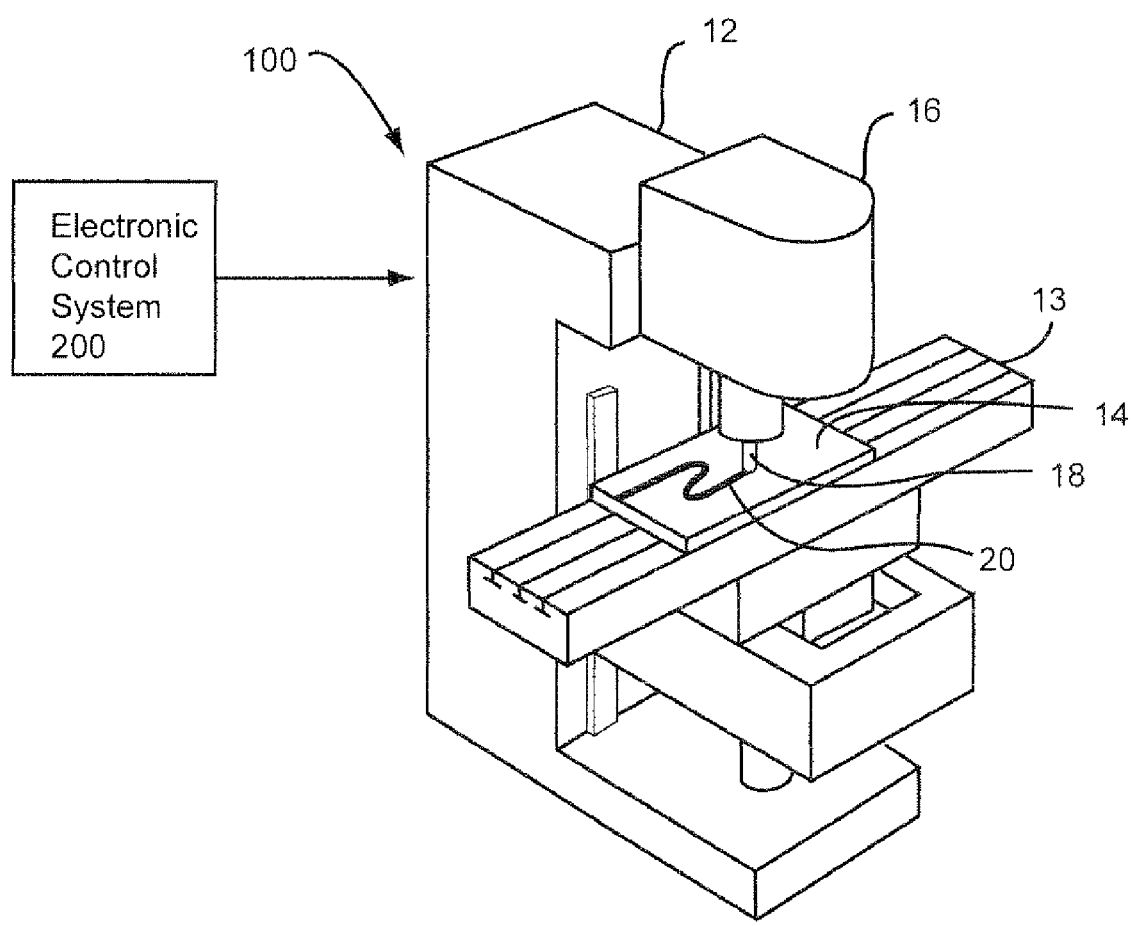
FIG. 1 shows exemplary illustrative non-limiting friction stir welding equipment.

FIG. 1 is a side perspective view of exemplary illustrative non-limiting friction stir welding (FSW) equipment 100. Equipment 100 includes a frame 12 that moveably suspends a spindle 16 above a backing 13 holding a workpiece(s) 14. A rotating pin 18 replaceably installed in the spindle (this rotating pin is sometimes herein referred to as "the tool") rotates in contact with the workpiece(s) 14. By rotating in contact with the workpiece(s) 14 with a desired amount of downforce, the rotating pin 18 accomplishes friction spin welding of the workpiece(s) thereby for example welding two separate abutting pieces together along a weld line 20.

An electronic control system 200 controls the operation of equipment 100. In the exemplary illustrative non-limiting implementation, equipment 100 includes spindle 16 mounted in such a way that it can be controllable moved and positioned relative to the workpiece(s) 14 clamped to or otherwise supported by the backing 13. The workpiece 14 typically comprises two pieces that are clamped to the backing 13 so as to abut one another. The equipment 100 automatically controls the spindle 16's position and orientation as well as the rate of rotation of the welding pin 18 mounted therein in order to accomplish friction stir welding under controlled conditions.

The specially designed tool 18 may be cylindrical with shoulders, and has a profiled threaded/unthreaded wear-resistant probe (pin or nub). The spindle 16 typically rotates the tool 18 at a constant speed and feeds the tool at a constant traverse rate. To join two pieces together, the tool 18 is inserted into a joint line between two pieces of sheet or plate material which are butted together. The parts are clamped rigidly onto a backing bar 13 in a manner that prevents the abutting joint faces from being forced apart. The length of the pin 18 is generally slightly less than the weld depth required. The tool shoulder is in contact with the work surface 14, and the pin 18 is then moved relative to the workpiece.

As the spindle 16 rotates pin 18, frictional heat is generated between the welding tool shoulder and pin and the material of the workpieces. This heat, along with the heat generated by the mechanical mixing process and the adiabatic heat within the material, causes the stirred materials to soften without reaching the melting point. The tool 18 traverses along the weld line. As the rotating pin 18 is moved in the direction of welding, the leading face of the pin, assisted by a special pin profile, forces plasticized material to the back of the pin while applying a substantial forging force to consolidate the weld material. The welding of the material is accomplished by plastic deformation and dynamic recrystallization in the solid state. The frictional stir welding equipment can be programmed to provide any of a variety of welding patterns for lap and butt joints in complex surfaces under electronic control (e.g., by a Numerical Control unit, as explained below).

As shown in FIG. 1A, in one example non-limiting implementation, the equipment 100 can control the translational and rotational position and orientation of the pin 18 relative to the backing 13 in six degrees of freedom. For example, the equipment 100 can translate the backing 13 back and forth (along the x axis) relative to the pin 18. Equipment 100 can also translate the pin 18 in two additional axes (y axis and z axis) relative to the backing, and the spindle 16, which is mounted inside the orbital head housing 121, can rotate the pin 18 about all three rotational axes (pitch axis A, yaw axis C, and additional linear axis W). In the example non-limiting implementation, W axis is the axis according to which the downforce acts substantially normal (90° or approximately 90°) to the surface of the workpiece. Through the movement provided according to W axis, the non-limiting example spindle 16 (inside the head housing 121) can perform linear "forward movement" and also linear "backward movement". When the position of the head housing 121 is zero degrees in the A axis (that is, when the head housing 121 is not inclined), the direction of the W axis is parallel to the direction of the Z axis. The W axis is thus used to perform linear movement independently of the other 5 axes, and constitutes a sixth axis. As these 6 axes may operate simultaneously, the equipment may operate in six degree of freedom. Such freedom of motion in six degrees of freedom provides a high degree of controllability. In addition, spindle 16 can control the amount of downforce the pin 18 exerts onto the workpiece.

Figure 1B:
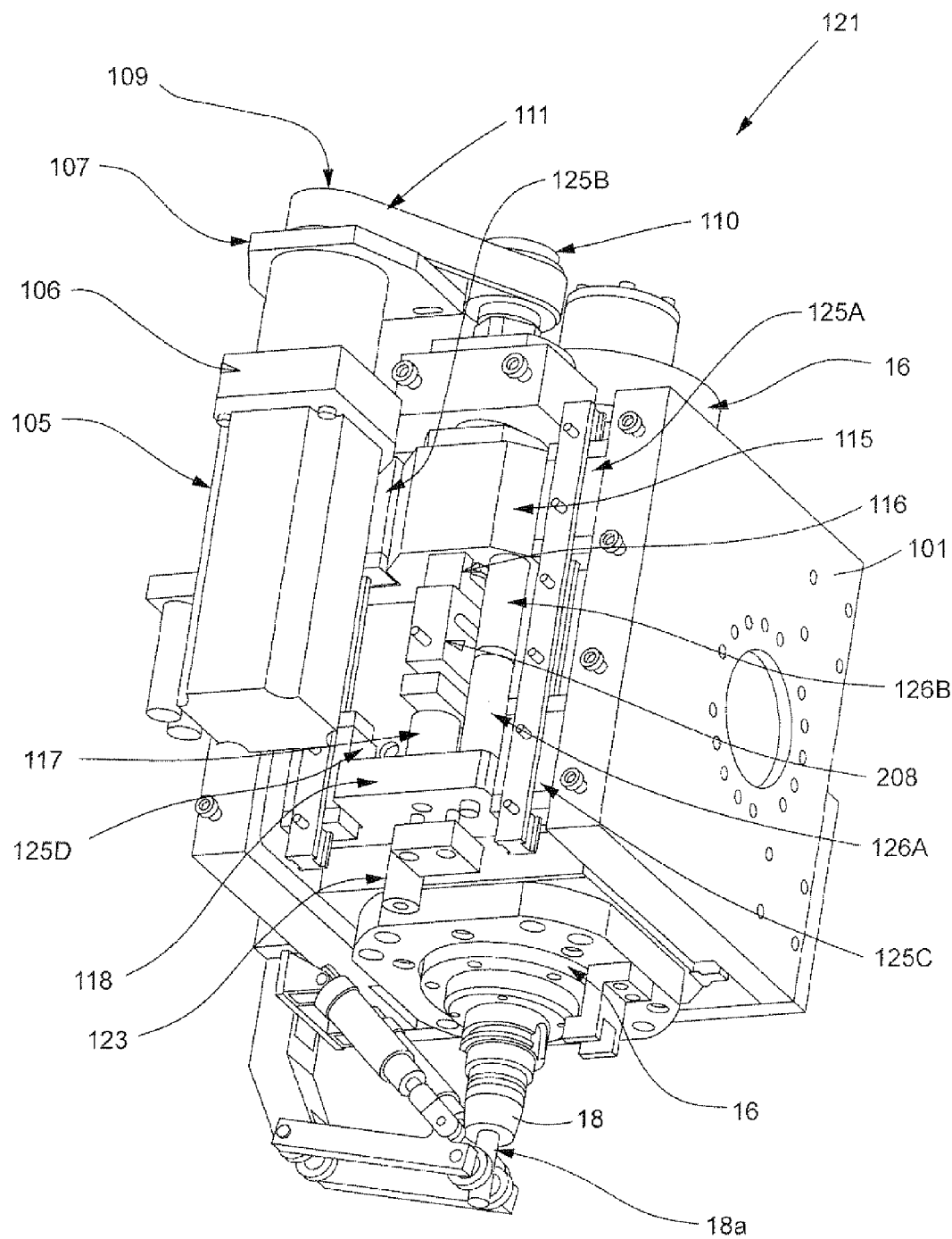
FIGS. 1B, 1C and 1D show more detailed views of the head housing portion of the FIG. 1A illustrative non-limiting friction stir welding equipment.
Figure 1C:
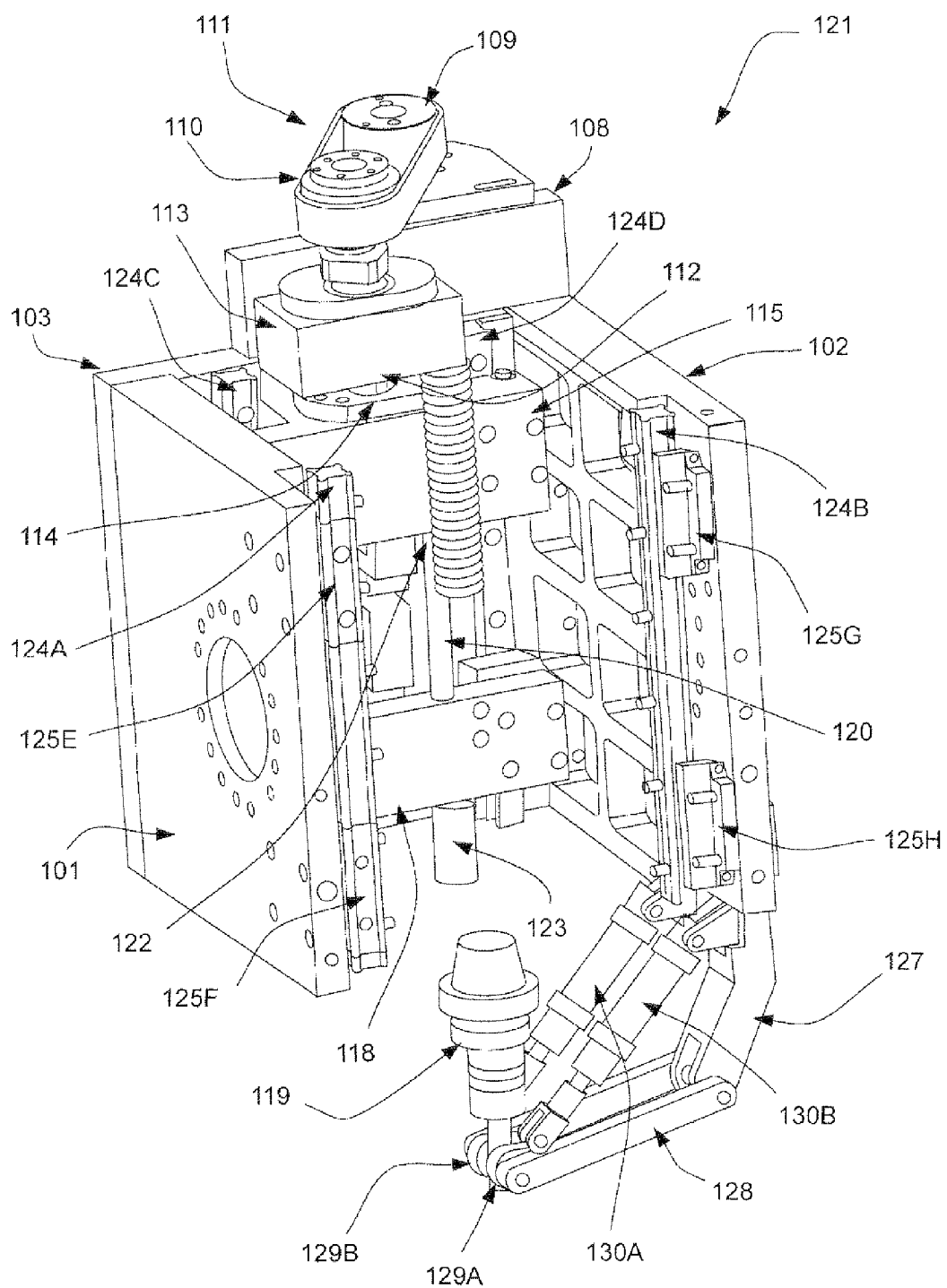
Figure 1D:
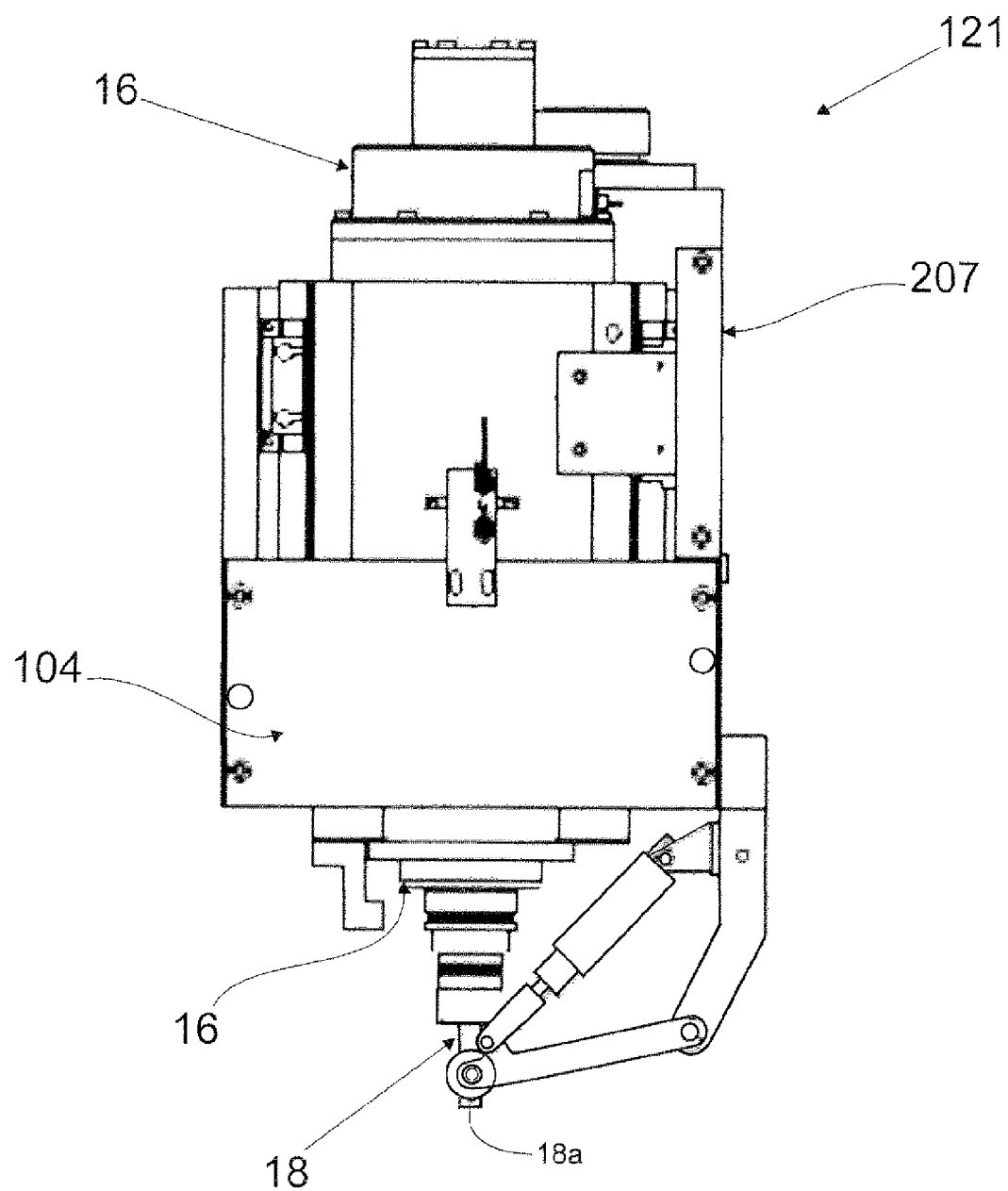

FIGS. 1B, 1C and 1D show more detailed views of the head housing 121 portion of the FIG. 1A illustrative non-limiting friction stir welding equipment.

FIG. 1B is a rear perspective view of the orbital head housing 121, but not showing the rear plate 103.

FIG. 1C is a front perspective view of the orbital head housing 121, but not showing the spindle 16 or the front plate 104.

FIG. 1D is a front view of the orbital head housing 121.

These three FIGS. 1B, 1C and 1D) show additional details of electromechanical control actuators provided inside and outside the orbital head housing 121 for accomplishing controlled motion and positioning of the spindle 16 and the pin 18 relative to the workpiece in six degrees of freedom, and further show details of a load cell 208 that can be used to dynamically sense downforce. Note that the term "downforce" as used herein is not limited to the amount of force the spindle 16 or pin 18 applies downward in the vertical direction (i.e., toward the center of the earth) but can encompass force the tool applies toward the workpiece no matter what orientation the tool and workpiece assume relative to the horizon. Thus, since head housing 121 can be controllably positioned in 6DOF, welding can occur in any orientation including for example upside down. In the upside down case, "downforce" is directed upwardly away from the center of the earth.

In more detail, as shown in FIGS. 1B, 1C and 1D, the orbital head housing 121 comprises a left side plate 101, a right side plate 102 parallel to the left side plate 101, a rear plate 103 perpendicularly associated to the rear edges of the left side plate 101 and the right side plate 102, and a frontal plate 104 parallel to the rear plate 103 and perpendicularly associated to the frontal edges of the left side plate 101 and right side plate 102. The left side plate 101, right side plate 102, rear plate 103 and frontal plate 104 are fastened together by means of screws, pins or any other equivalent mean, forming a substantially rectangular box in which the height of the front plate 104 is smaller than the height of the others plates, as shown in FIG. 1D. The spindle 16 is installed inside the orbital head housing 121. FIGS. 1B and 1D show that the height of spindle 16 is greater than the height of the plates 101, 102 and 103. These FIGS. 1B and 1D show that the upper and lower ends of spindle 16 are, respectively, beyond the upper and lower ends of plates 101, 102 and 103. The spindle 16 may be a type of electromechanical spindle in some example non-limiting embodiments.

As shown in FIG. 1B, the orbital head housing 121 comprises a servomotor 105 fixed to an external portion of the rear plate 103, close to the rear edge of the right side plate 102 (see FIG. 1C). A reducer 106 is positioned above the servomotor 105. A first pulley 109 is connected to a second pulley 110 through a driving belt 111 so that the servomotor 105 drives the reducer 106 that turns the first pulley 109. First pulley 109 transmits the rotation to a second pulley 110 by means of the driving belt 111, according to a known and determinate transmission ratio.

The ensemble of servomotor 105, reducer 106 and first pulley 109 is fixed to the rear plate 103 through a reinforcement element 108 positioned above to an upper border of the rear plate 103 (FIG. 1C) through a fastening plate 107 displaced perpendicularly to the reinforcement element.

As shown in FIG. 1C, a ball screw 112 is supported by a bearing 113 that is parallel to the reinforcement element 108. The ball screw 112 is linked to the second pulley 110 so that the rotation of this second pulley 110 is transmitted to the ball screw 112. Rotating ball screw 112 moves a screw-nut 114 toward the W-axis 206. The screw-nut 114 is placed under the bearing 113 and associated with a support 115. Thus, the movement of screw-nut 114 is transmitted to the support 115 that moves lineally toward the W-axis 206 as well.

As can be seen in FIG. 1B and 1C, the support 115 comprises lateral portions sustained by sphere supports 125A and 125B that are parallel to each other and positioned on linear guides 124C and 124D that are parallel to each other and fixed to an inside portion of the rear plate 103. Sphere supports 125A, 125B comprise supports with spheres within them. The spheres allow the sphere supports 124A, 124B to slide over the linear guides 124C, 124D. The support 115 is also longitudinally associated to a wedge 116 which is positioned bellow the support 115. The wedge 116 is connected to the load cell 208 which is connected to a fixer 117. The linear movement of the support 115 (and the respective sphere supports 125A and 125B) over the linear guides 124C and 124D moves lineally the wedge 116, the load cell 208 and the fixer 117 in a compact way and in the same direction, that is, toward the W-axis 206 and in the feed direction (forward direction). The fixer 117 movement creates a linear movement to a support element 118 whose horizontal portion is positioned under the fixer 117.

As shown in FIGS. 1B and 1C, the support element 118 comprises a horizontal portion and a vertical portion in which a spindle 16 is fixed. The horizontal portion of the support element 118 can be seen in FIG. 1B and its vertical portion can be seen in FIG. 1C. The vertical portion of the support element 118 has its lateral portions sustained by sphere supports 125C and 125D that are parallel to each other and positioned on linear guides 124C and 124D that are parallel to each other. Hence, the linear movement of support element 118 (and the respective sphere supports 125C and 125D) over the line guides 124C and 124D together with the linear movement of the support 115 provides a feed movement (forward movement) of the spindle 16. The support 115, the wedge 116, the load cell 208, the fixer 117 and the support element 118 are aligned, one over to another, so that the linear movement toward W-axis 206 is transmitted among these components and to the spindle 16.

Consequently, when the servomotor 105 provides clockwise rotation, for example, the movement of the above mentioned ensemble is made to the feed direction (forward direction) of the spindle 16 toward the piece to be welded. When the servomotor 105 provides anti-clockwise rotation, for example, the movement of the above mentioned ensemble is made to retreat the spindle 16, that is, in the opposite direction away from the piece to be welded.

According to FIG. 1C, a tensor screw 120 is fixed at the lower portion of the support 115 and kept fixed by a join nut 122. This tensor screw 120 goes through the support element 118 by a passing bore (not shown) so that after crossing the support element 118 the edge of the tensor screw 120 is connected to a tensor nut 123 displaced under the support element 118.

When the spindle 16 is compressed against the piece to be welded, resistance strength (resistance load) is created in the opposite way and transferred to the load cell 208 by the support element 118 and the fixer 117. The function of the load cell 208 is to measure the resistance strength. In one example non-limiting implementation, this resistance strength can not go beyond a predetermined limit. Consequently, as can be seen in FIG. 1B, first and second protector shanks 126A and 126B are positioned parallelly to the load cell 208. The first protector shank 126A is fastened over the horizontal portion of support element 118, while the second protector shank 126B is fastened under the support 115, that is, at the lower portion of the support 115. The distance between the first protector shank 126A upper edge and the second protector shank 126B lower edge corresponds to the limit of the resistance strength supported by the load cell 208. A strength that exceeds this limit tends to be limited to prevent damage to the load cell 208.

Spindle 16 movement toward a W-axis 206 direction will match the movement of this spindle 16 towards a Z-axis 203 direction when the orbital head housing 121 is not inclined.

In this sense, the movement of spindle 16 toward the Z-axis 203 direction is made by the structure that supports the orbital head housing 121—see FIG. 1A.

As shown in FIG. 1C, a first linear guide 124A is placed over a pair of sphere supports 125E and 125F fastened to the left side plate 101 apart and parallel from each other. A second linear guide 124B is placed over a pair of sphere supports 125G and 125H fastened to the right side plate 102 apart and parallel from each other. The first and second linear guides 124A and 124B are placed parallel from the left side plate 101 and the right side plate 102 respectively and close to the frontal plate 104.

The first and second linear guides 124A and 124B are fastened to the spindle 16 so that when the spindle 16 moves toward a W-axis 206 direction, the first and second linear guides 124A and 124B move lineally over their respective pairs of sphere supports 125E and 125F, 125G and 125H.

The lower portion of spindle 16 comprises a tool holder 119 in which the rotating pin 18 is fastened as shown in FIGS. 1B and 1D and also in FIG. 1C in which the spindle 16 is not shown.

A clamping ensemble is attached to a lower portion of the right side plate 102—see FIGS. 1B, 1C and 1D. The use of this clamping ensemble is optional. Its function is to clamp the work piece 14 against the backing 13. This clamping ensemble is formed by a first support shaft 127 that extends downward from the lower portion of right side plate 102 and a second support shaft 128 with an open space. This second support shaft 128 comprises one of its edges associated to the first support shaft 127 by an articulation and a pair of clamping rollers 129A, 129B connected to its second edge opposite from the articulation.

The clamping ensemble comprises a pair of controlling cylinders (actuators) 130A, 130B, wherein a first edge of each cylinder 130A, 130B is associated to an upper portion of the first support shaft 127 next to the right side plate 102, opposite to the articulation and a second edge of each cylinder 130A, 130B is associated to the second support shaft 128 next to the clamping rollers 129A, 129B.

Therefore, the rotating pin 18 is connected to the tool holder 119 so that one of the rotating pin 18 edge is fixed by the tool holder 119 and the opposite edge of the rotating pin 18 is positioned between the clamping rollers 129A, 129B (next to the second support shaft 128).

As shown in FIG. 1D, the frontal plate 104 comprises a linear transducer 207. The linear transducer 207 is responsible to send the information of W-axis 206 position to the PLC 216 to keep the tool a safe distance (i.e, at least minimum clearance) from the backing during welding.

The arrangement explained above and shown in FIGS. 1A-1D allows a compact orbital head-housing 121 that comprises a spindle 16 in such a way that all movements of the spindle 16 (in six degrees of freedom) are performed by electric and mechanical means (aided by electronics) without the need for hydraulic means.

Figure 2:
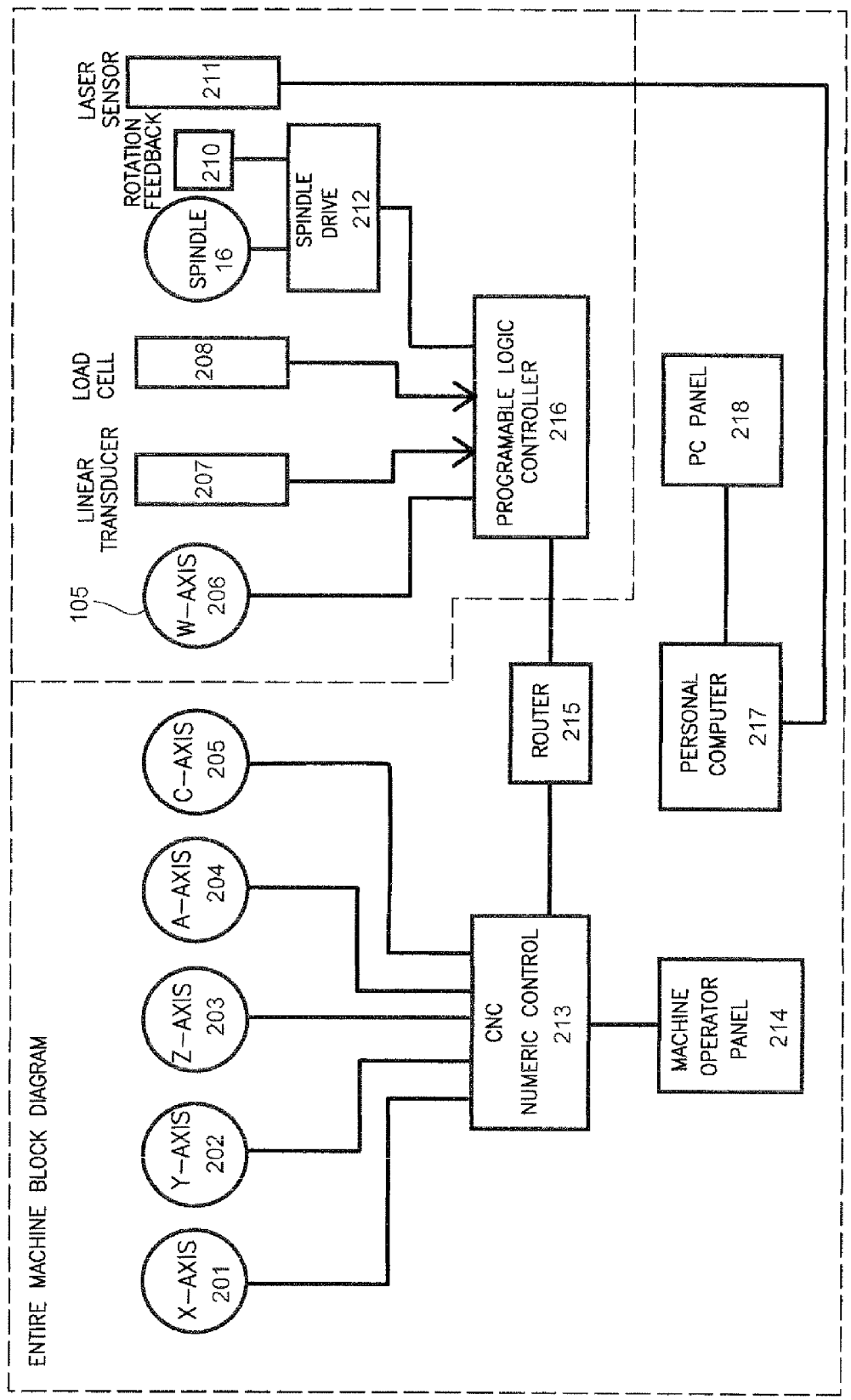
FIG. 2 shows an overall exemplary illustrative non-limiting electronic control system block diagram.

FIG. 2 is a schematic illustration of an exemplary illustrative non-limiting electronic control system 200. Non-limiting control system 200 includes a CNC numeric control 213, a machine operator panel 214, a router 215, a programmable logic controller 216, a personal computer 217, and a PC panel 218. CNC numeric controller 213 controls servomotors which position and move the head housing 121 in three axes of translation and two axes of rotation. Programmable logic controller 216 controls a servomotor 105 for the spindle 16's W-axis 206, and also receives inputs from linear transducer 207 and load cell 208. Spindle 16 is controlled by a spindle drive 212 at least in part in response to rotational feedback sensor 210. A laser sensor 211 may be used to accurately sense position of the tool relative to the backing surface. Personal computer 217 or other suitable processor coordinates the operation of CNC numeric controller 213 and programmable logic controller 216 in response to user inputs from machine operator panel 214 and PC panel 218.

The Numeric Control 213 is responsible to provide precision control of five axis (201, 202, 203, 204, 205) and send information of their position to the Personal Computer 217 and PLC 216 through the Router 215. Machine Operator Panel 214 is used to operate all the functions of the machine. The load control and laser scanning is operated using the PC Panel 218 as an interface for a viewer.

Figure 2A:
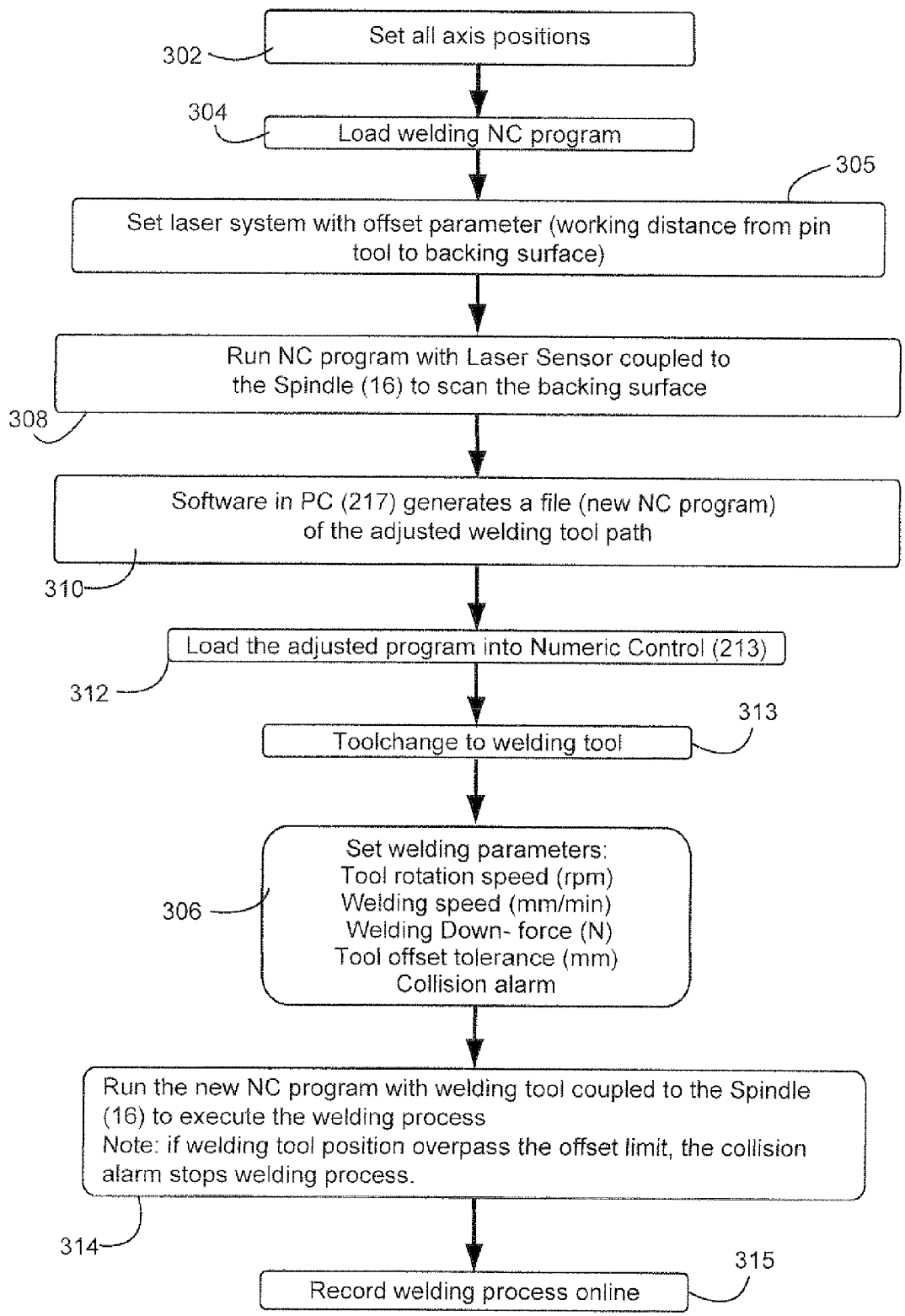
FIG. 2A shows an exemplary illustrative non-limiting machine control algorithm and process.

As shown in FIG. 2A, an exemplary algorithm or process for operating equipment 100 comprises:
  Execute homing command to set all the positions of the five axes (block 302)
  Load the NC program of the welding tool path into Numeric Control 213 (block 304)
  Set laser system with offset parameter (working distance from pin tool to backing surface) (block 305)
  Run the program with Laser Sensor coupled to the Spindle 16 to scan the backing surface (block 308)
  The software in PC 217 generates a file (new NC program) of the adjusted welding tool path (block 310)
  Load the adjusted program into Numeric Control 213 (block 312)
  Change the tool from the laser sensor to the welding tool (block 313)
  Set up the welding process parameters (block 306)
  Run the new NC program with welding tool coupled to the Spindle 16 to execute the welding process (block 314)
  If welding tool position overpasses an offset limit, the collision alarm stops the welding process (block 314)
  Record welding process (block 315)

Figure 3:
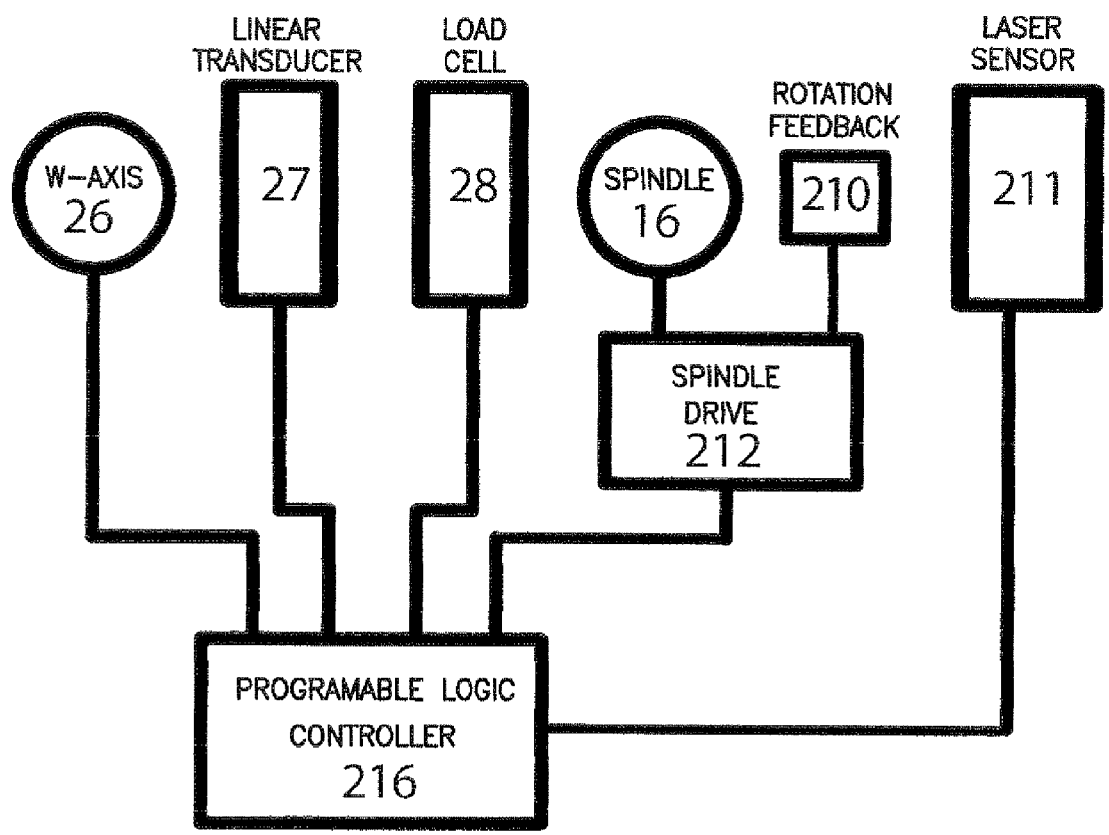
FIG. 3 shows an exemplary illustrative non-limiting portion of the FIG. 2 control system including spindle control components.
Figure 4:
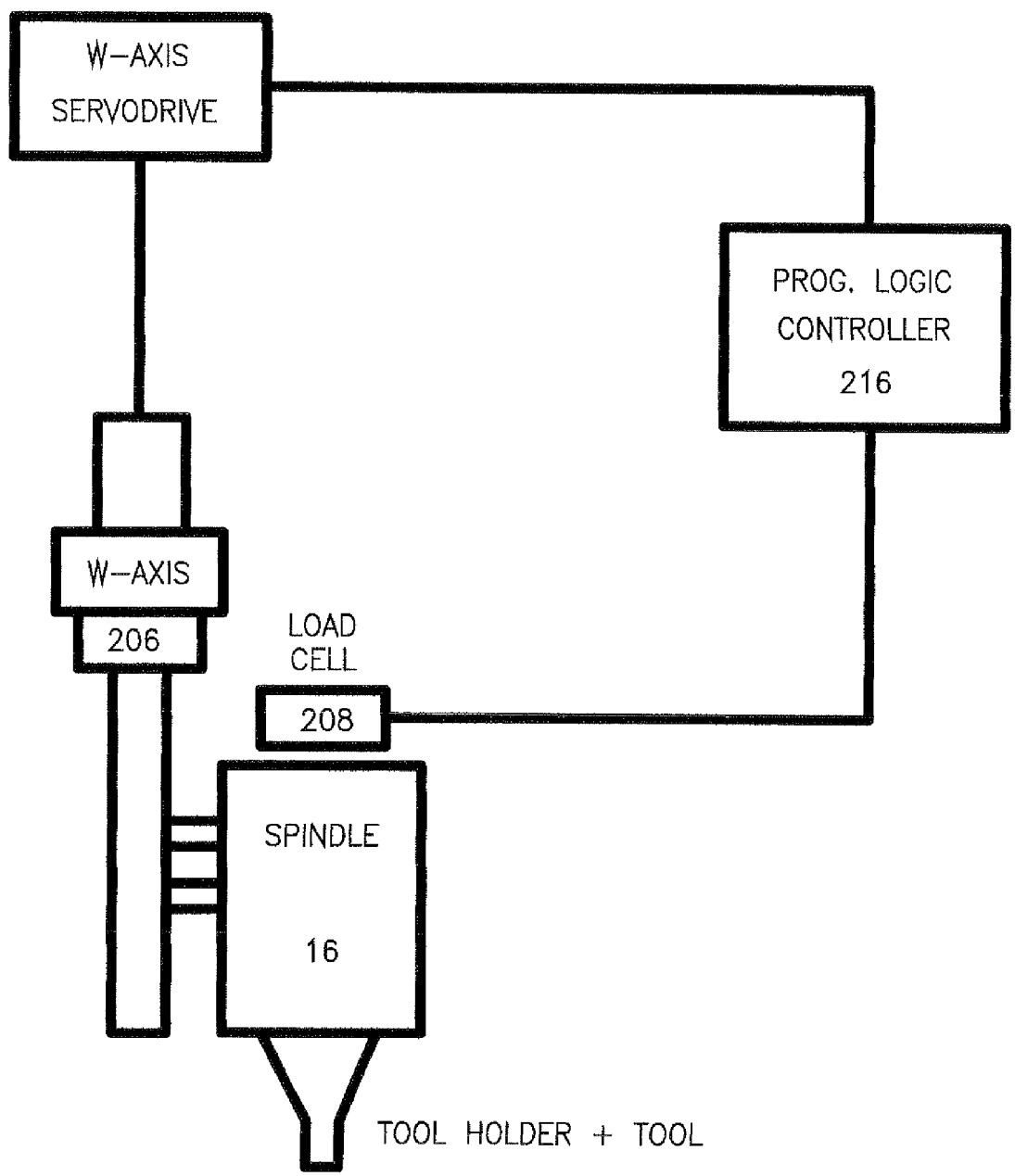
FIG. 4 shows an exemplary illustrative spindle downforce control system.

FIGS. 3 and 4 show an exemplary spindle and load control provided by the programmable logic controller 216. The welding process on exemplary illustrative non-limiting machine 100 works according to a load control process. The exemplary load control is responsive to load cell 208 that measures the direct axial downforce applied to the workpiece. It is also responsive to a precision position measure system provided by a linear transducer 207.

The exemplary illustrative non-limiting Programmable Controller 216 receives the following signals which it uses to provide precision control of the process:
  W axis position;
  Downforce value;
  Status of Numeric Control (alarms and faults).

The exemplary illustrative non-limiting system monitors and controls the following items:
  Downforce applied to workpiece during weld;
  Distance from welding tool to the backing;
  Spindle rotation speed.

The Numeric Control 213 receives the following information from Programmable controller 216:
  Status of the system (alarms and faults)
  Process welding parameters values.

The exemplary illustrative non-limiting system 100 works by controlling the downforce applied to the workpiece and simultaneously monitoring the distance from pin tool to the backing to avoid collisions.

In more detail, the W-Axis actuator 206 is responsible to move the spindle motor inside the head housing 121. The linear transducer 207 is responsible to send the information of W axis position to the PLC 216 to keep the tool a safe distance (i.e, at least minimum clearance) from the backing during welding. Load Cell 208 directly measures the pressure applied to the workpiece during welding in the W axis. Spindle 16 provides the rotation to the tool 18. Rotation feedback sensor 210 measures rotation of the spindle 16 and sends it to the Spindle drive 212 to keep it in a fixed (constant or substantially constant) rotation during welding.

Laser Sensor 211 scans the welding backing surface and sends the information to the PC 217 to adjust the tool path in the welding NC (numerical control) program. Spindle drive 212 controls the rotation of the tool. Programmable Logic Controller 216 controls all the logic of the system include the downforce control and security of the distance from tool to backing to avoid collisions.

Exemplary Illustrative Non-Limiting Welding Downforce Control

The exemplary illustrative non-limiting implementation provides downforce control by measuring directly the load applied on the workpiece during all processes (see FIG. 4). There are three parameters for this control in the exemplary illustrative non-limiting implementation; all of them are previously set or predetermined before starting the welding process. The three parameters are:
  1—Downforce into workpiece (set-point load);
  2—Downforce work tolerance (range of work);
  3—Downforce collision limit (to protect the machine and backing).

The exemplary illustrative non-limiting system 100 provides a precision closed loop control where the PLC 216 acts directly in the W-axis Servo Drive to maintain the load between tolerance limits (referred to a set-point load) during all welding. To avoid oscillations of the load applied to the workpiece, the control comprises with a PID (proportional integral derivative) control which maintains the load constant during the welding process.

Exemplary Illustrative Non-Limiting Scanning Of The Welding Backing Surface

To start the scanning process, the Laser Sensor 211 is coupled to the Spindle 16 with the respective tool holder. After scanning, the laser sensor 211 can be removed and the welding tool 18 is installed in the tool holder in its place to start the welding process.

Figure 5:
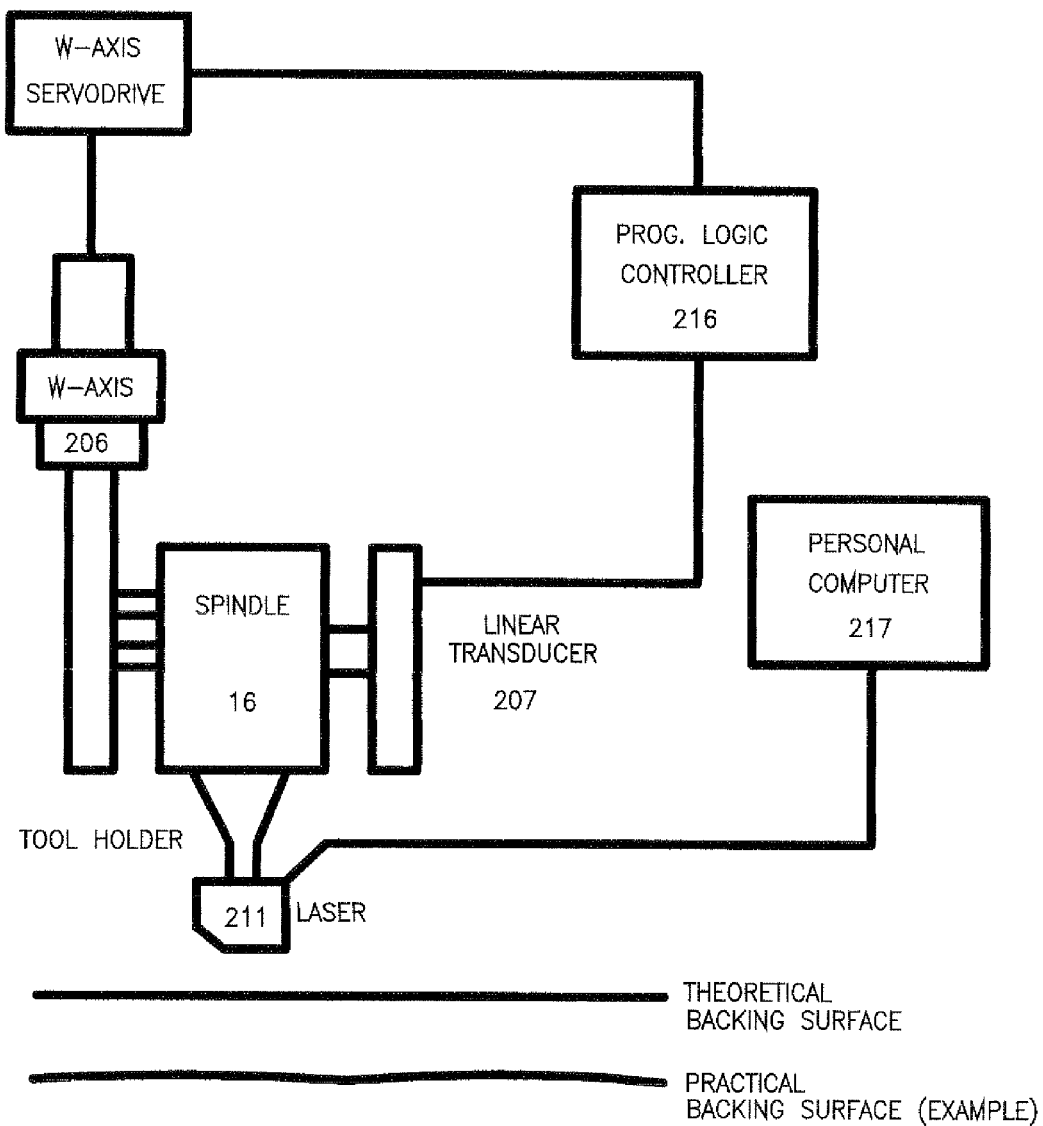
FIG. 5 shows an exemplary illustrative spindle downforce control system using a laser sensor to sense variations in distance to a backing surface.

The scanning is used to adjust any deviation of the backing surface compared with the theoretical surface where the workpiece is placed (see FIG. 5). A parameter set according to process features represents the working distance from the pin tool 18 to the backing. In the exemplary illustrative non-limiting implementation, the alarm system responds directly to this adjustment. The adjustment provided by the scanning of laser sensor 211 thus provides working accuracy for the alarm.

Figure 6:
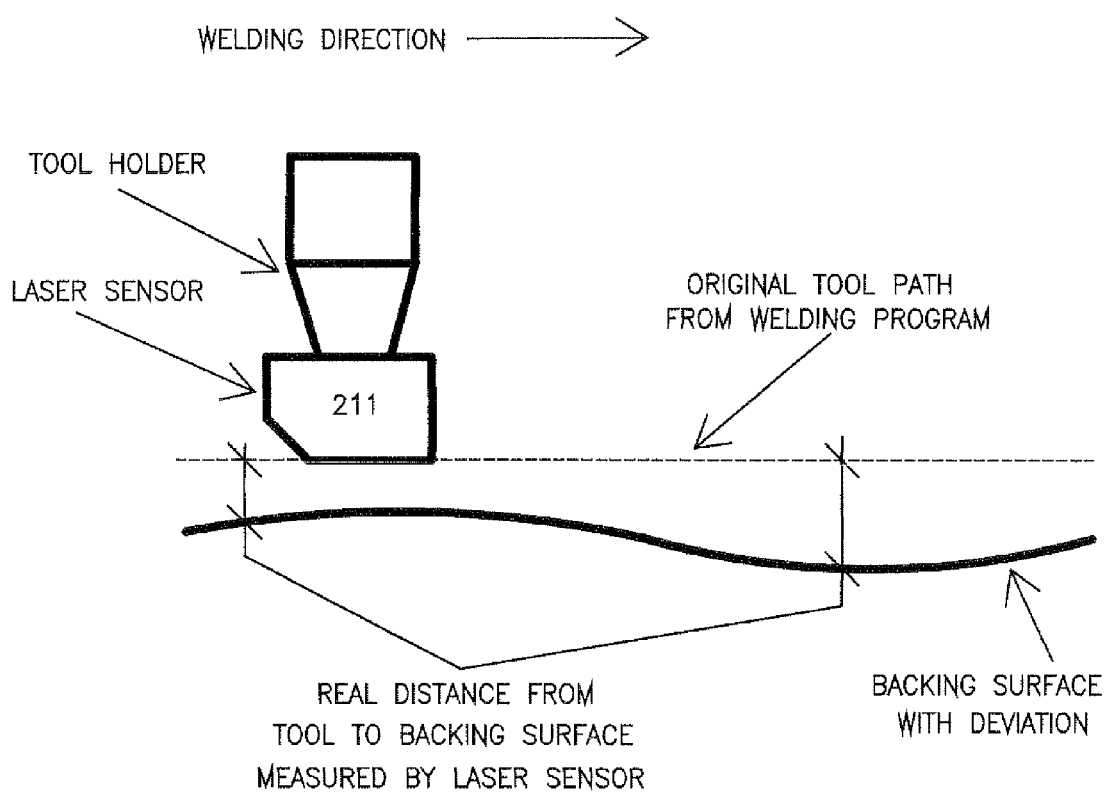
FIG. 6 illustrates an exemplary illustrative technique for using a laser sensor to sense actual distance to the backing surface.

The exemplary illustrative non-limiting scanning process involves running the welding program with a laser sensor 211 coupled in the spindle 16 as shown in the FIG. 6. When the program is running, the measuring data from the laser system records simultaneously in the PC 217. After the program is finished, the software in the PC generates a file of the adjusted welding tool path. The adjusted program is used in the machine to start the welding process.

Exemplary Illustrative Non-Limiting Distance Monitoring For Alarm System

Figure 7:
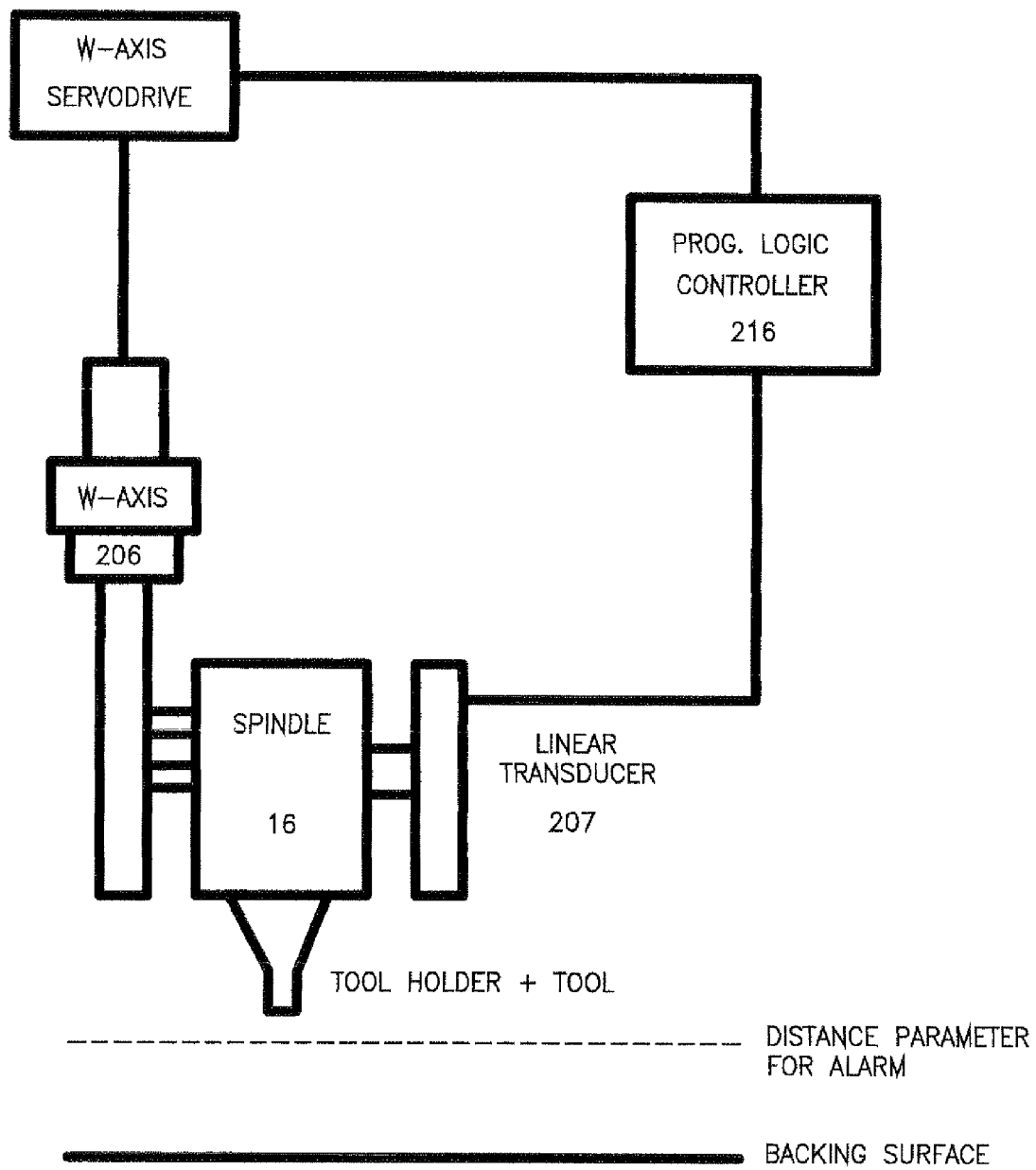
FIG. 7 shows the FIG. 5 implementation using the distance the laser sensor sensed to establish a distance alarm threshold.

The exemplary illustrative non-limiting system 100 provides precision monitoring using linear transducer 207 and PLC 216 (see FIG. 7). The security of the backing provides a precise alarm system that works to protect the backing against collisions with the pin tool during the automatic welding process. This system works with high accuracy after the scanning of the backing surface. When the machine is working, the system 100 follows the NC (Numeric Control) program adjusted and simultaneously monitors the minimum distance from tool to backing (distance parameter for alarm system).

Figure 8:
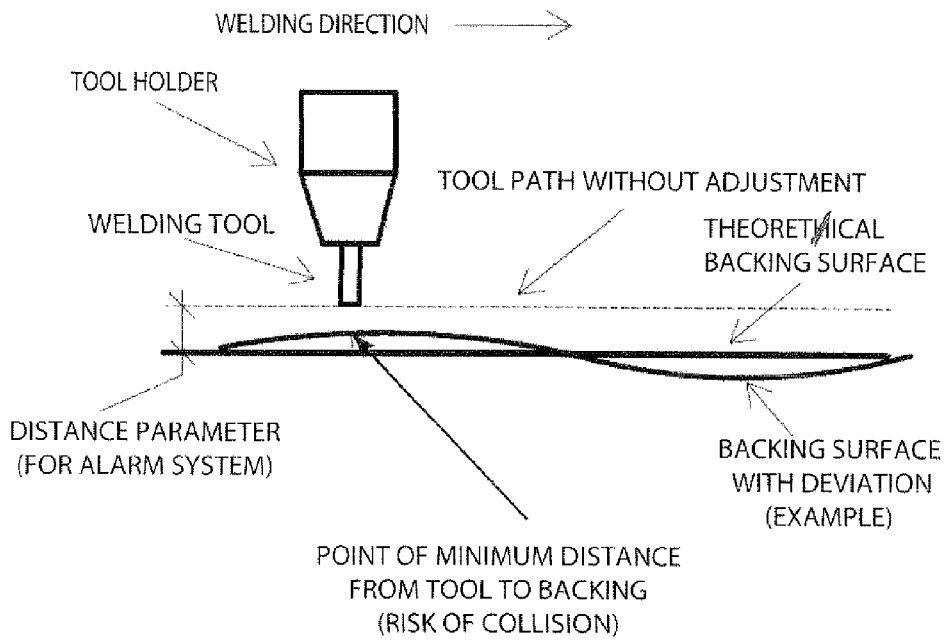
FIG. 8 shows an exemplary illustrative non-limiting prior art technique for controlling tool minimum distance to backing that sometimes caused collisions.

FIG. 8 shows an exemplary illustrative non-limiting prior art welding process without a laser scanning step previously performed. In this situation, the system understands or assumes the backing surface is a line or flat plane without deviations. Thus, considering that the tool path is not adjusted, risks of collision may occur at the points where the tool passes with a minimum distance from the backing.

Figure 9:
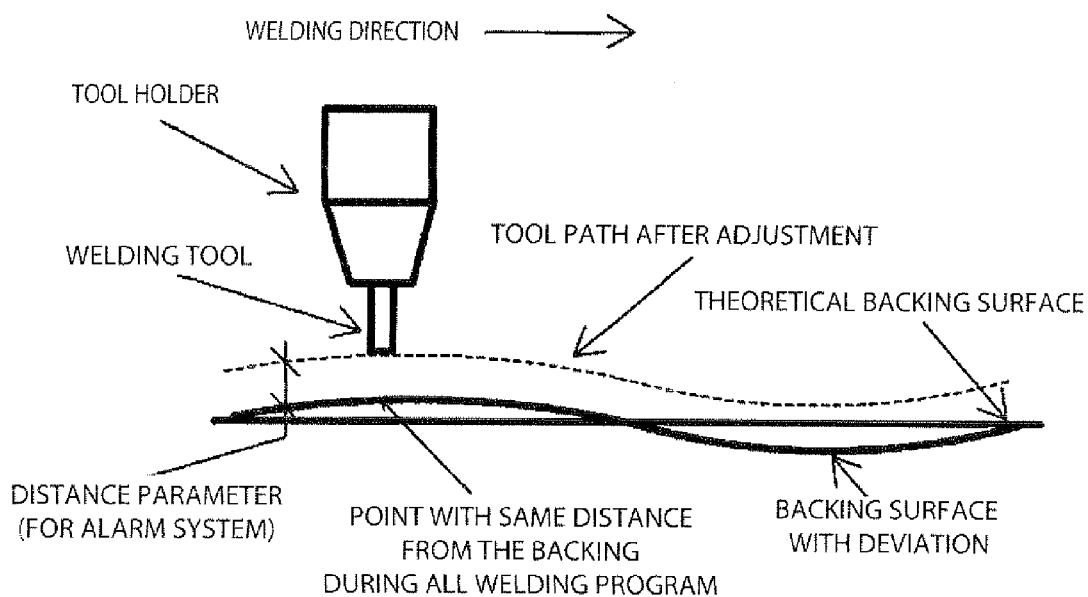
FIG. 9 shows a further exemplary illustrative non-limiting technique for controlling tool minimum distance to backing through use of laser sensing of actual distance to the backing surface, thereby avoiding collisions.

FIG. 9 illustrates the welding process after system 100 has performed the scanning step. Scanning with the laser sensor 211 provides a kind of map of the backing surface. Such map could include three dimensional features of the backing for example. After scanning of the backing surface, the tool path is adjusted and the distance monitoring for the alarm system will work with high accuracy to avoid collisions between the pin tool 18 and the backing. There is a parameter (distance parameter for alarm) set on the Operator Panel 214 that refers to the minimum distance from the tool 18 to the backing. This parameter is adjusted according with workpiece thickness, process and tool features in the exemplary illustrative non-limiting implementation.

Figure 10:
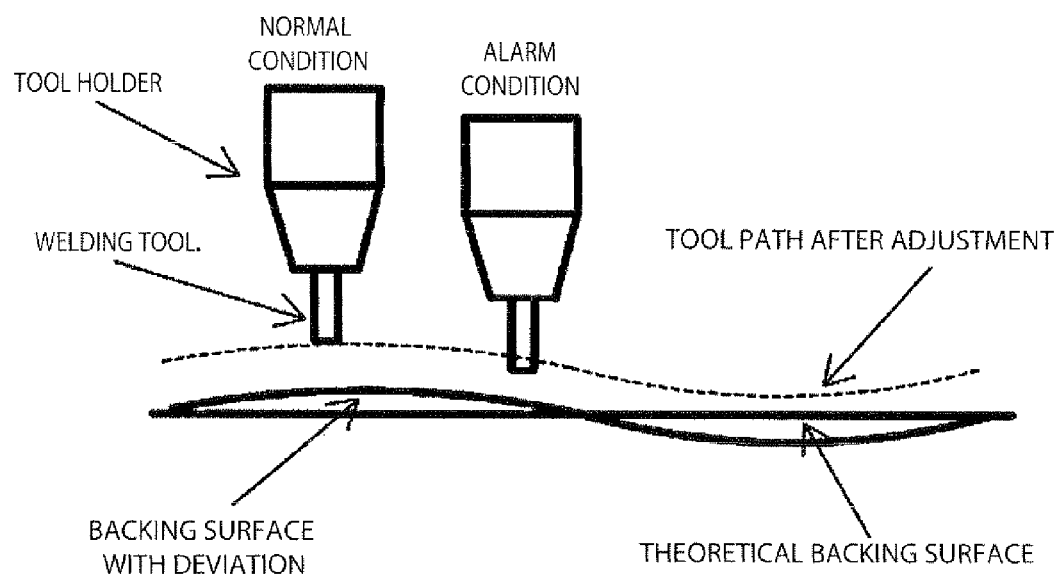
FIG. 10 shows an exemplary illustrative non-limiting alarm generation technique.

FIG. 10 shows an exemplary illustrative non-limiting welding process alarm system operation. When the program starts, the system 100 also starts monitoring this distance parameter measured by the Linear Transducer 207. If the tool activates a set-point distance for triggering an alarm, the execution of the program stops, all positional and orientation axes are maintain in a stopped or frozen state, the PLC 216 commands the W-axis servo drive to take the W-axis out of the workpiece, and an alarm is shown in the Operator Panel 214.

The welding parameters of downforce and W axis position are recorded by Personal Computer 217 in real time during the welding process in order to register and analyze the welding performance.

Figure 11:
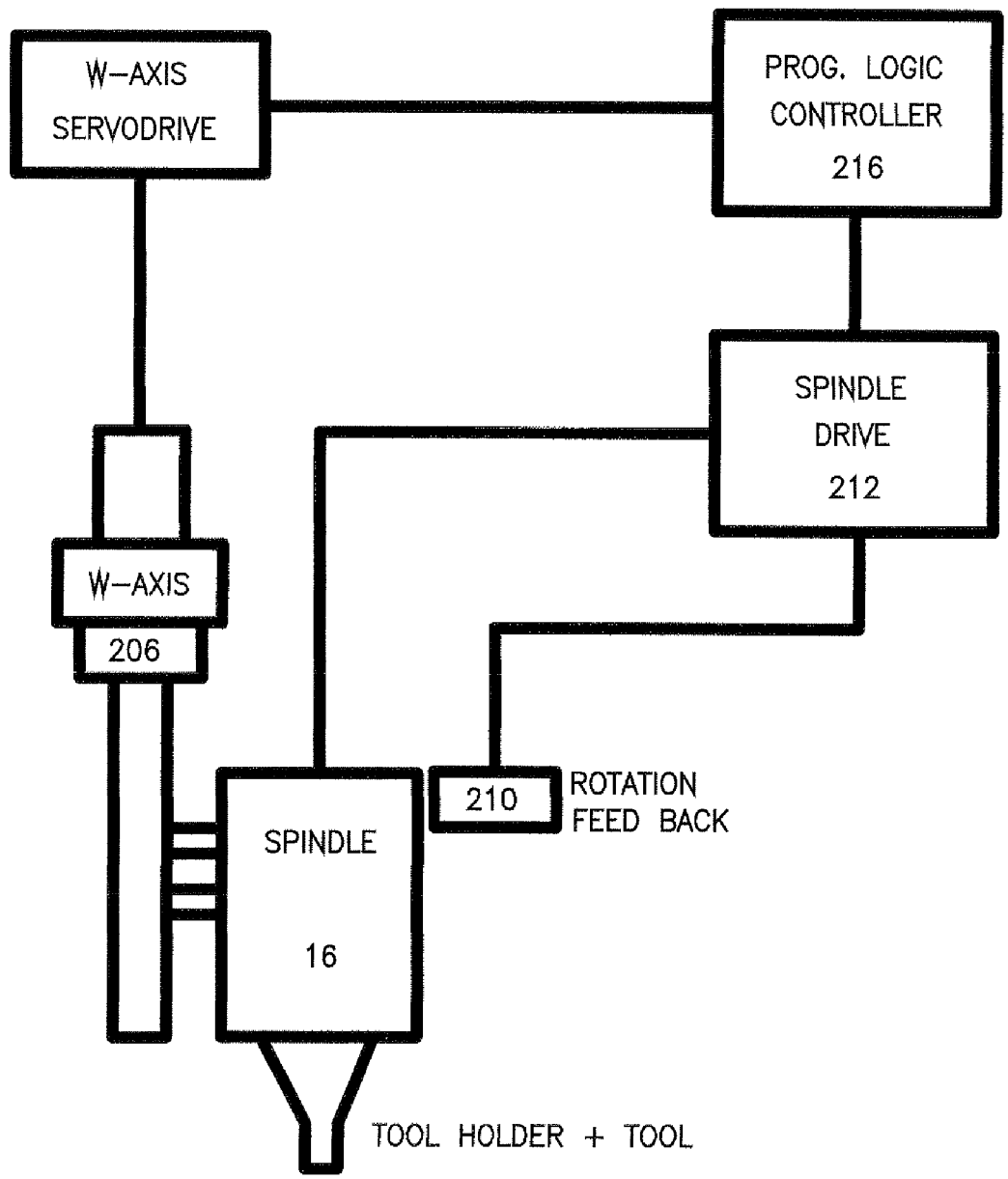
FIG. 11 shows an exemplary illustrative non-limiting closed loop feedback control technique for controlling friction stir welding rotation.

The system has a rotation control for the spindle 16 provided by a rotation feed back 210. The rotation feed back is performed using a pulse sensor. The signal feed back is sent to the spindle drive 212 closing a control loop to maintain constant velocity (FIG. 11). This closed loop feedback is used to keep the tool rotation constant during the welding process.

Figure 12:
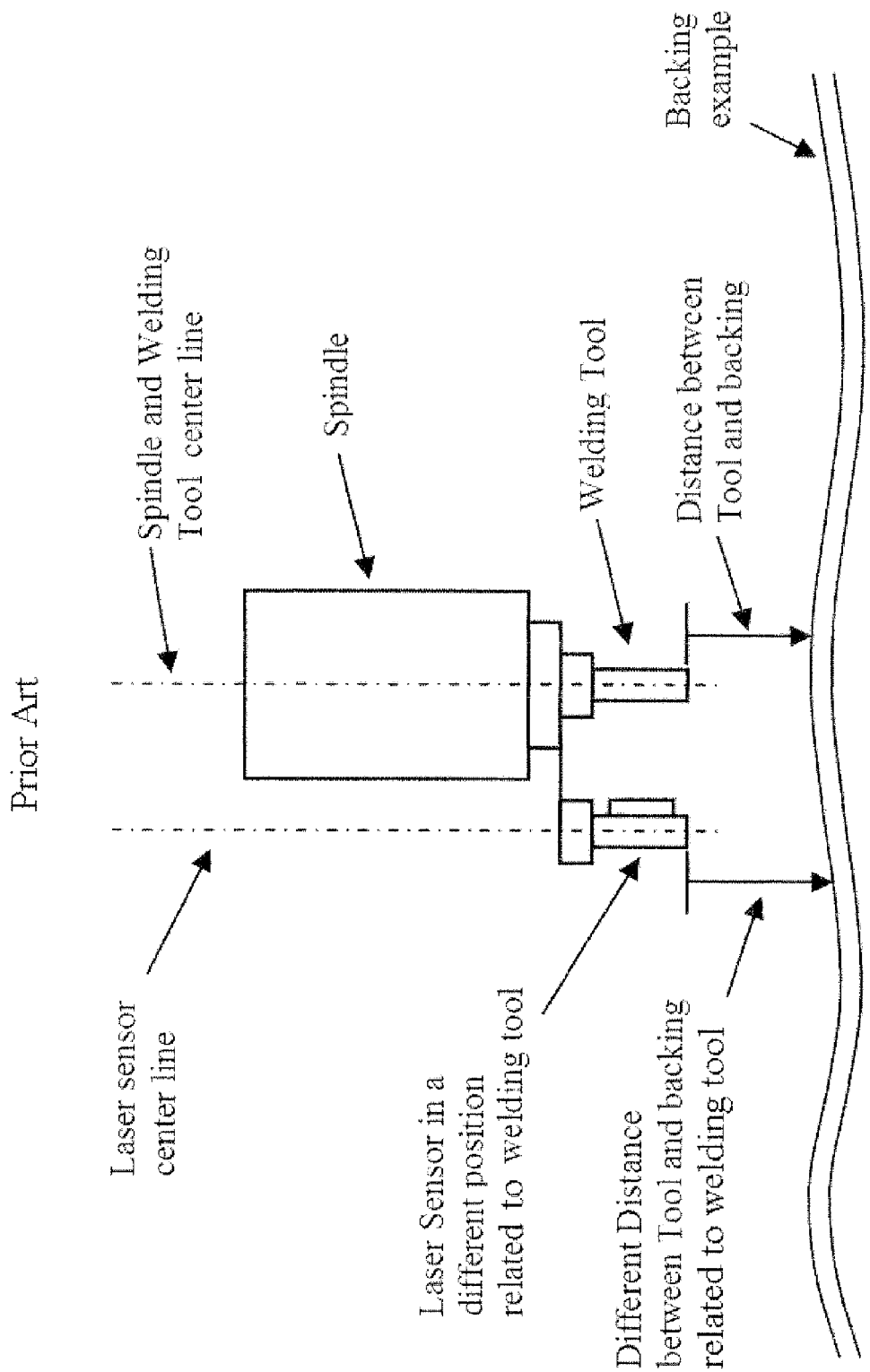
FIGS. 12 and 12A illustrate prior art use of a laser sensor which is not interchangeable with the rotating tool (welding tool), when the welding path is not linear, but elliptical, for example.
Figure 12A:
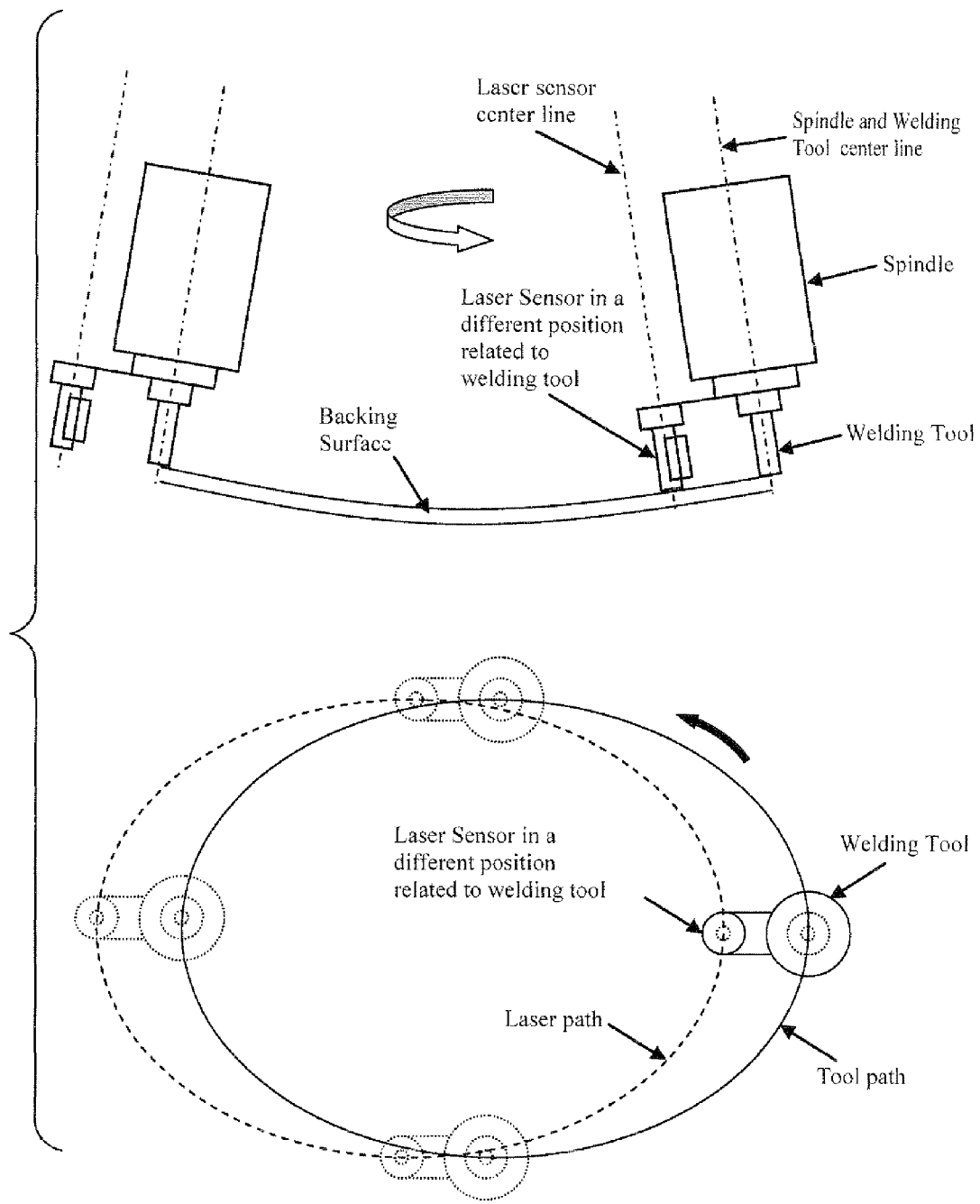

FIGS. 12 and 12A illustrate the disadvantage of using a laser sensor which is not interchangeable with the rotating tool 18 (welding tool), when the welding path is not linear, but elliptical, for example. If a laser sensor was assembled in a different position from the position aligned with the spindle tool center line, that is, if the laser sensor is not interchangeable with the rotating tool, it would not allow correct measurement of the tool path (the real tool path) on complex surfaces.

Figure 13:
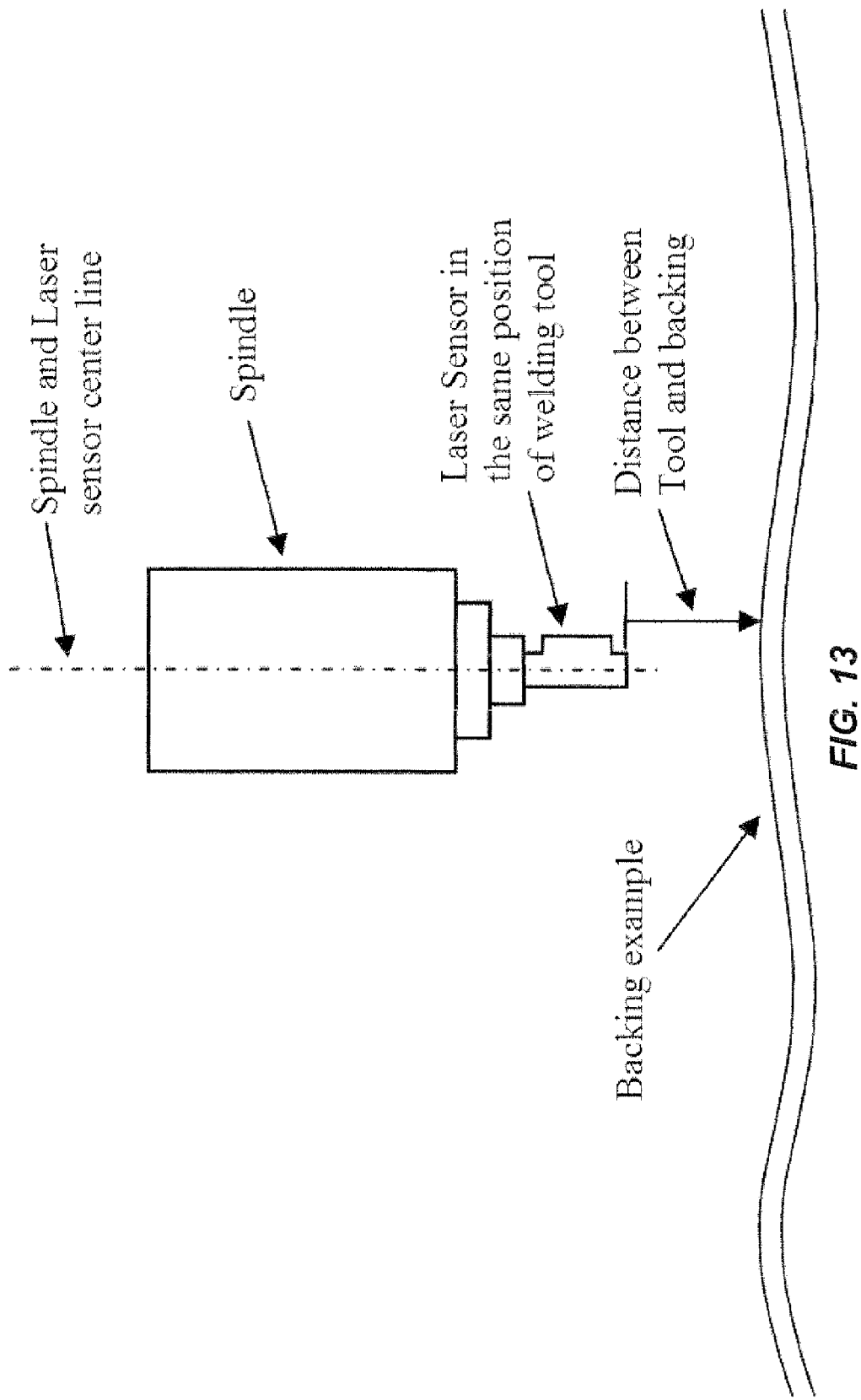
FIGS. 13 and 13A illustrates using an example non-limiting laser sensor which is interchangeable with the rotating tool (welding tool), when the welding path is not linear, but elliptical, for example.
Figure 13A:
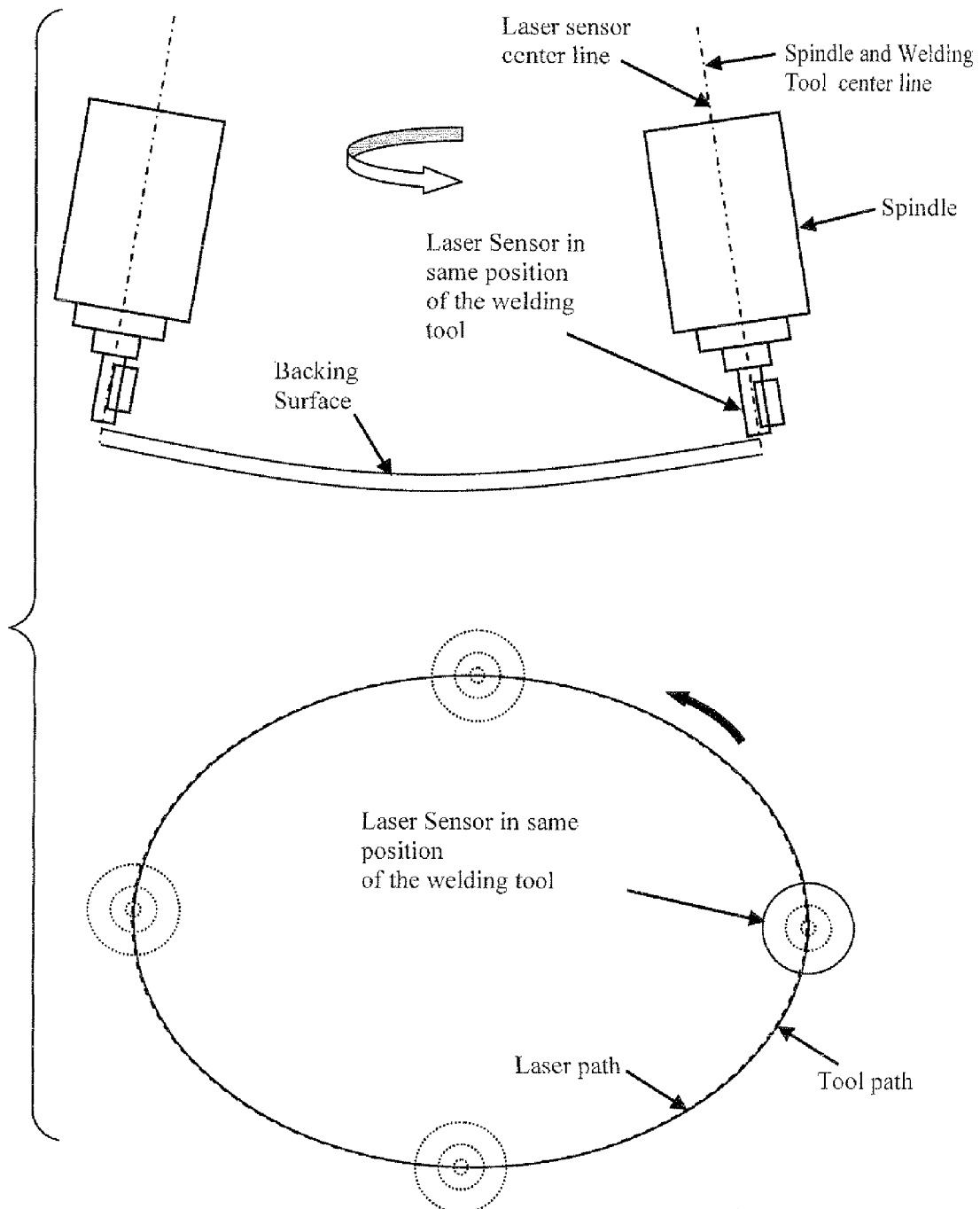

FIGS. 13 and 13A illustrate the advantage of using a laser sensor 211 which is interchangeable with the rotating tool 18 (welding tool), when the welding path is not linear, but elliptical, for example.

The example non-limiting laser sensor 211 may be a laser sensor for direct reflective materials which measures the distance by triangulation technique, which ensures measurement precision of about 0.5 µm. Said laser sensor 211, which is interchangeable with the rotating tool 18, is assembled completely aligned with spindle tool center line by a coupled tool holder (that may be of a HSK type). The laser sensor 211 is able to measure the real axial distance from spindle 16 to the backing surface on complex tool path. This means that the laser sensor 211, which is coupled in a real tool position, allows the measurement of the real path (that is, the same path that will be covered by the welding tool) which is much more convenient for adjusting tool path coordinates to welding CNC program according to backing surface (tooling surface) before starting the welding process.

While the technology herein has been described in connection with exemplary illustrative non-limiting implementations, the invention is not to be limited by the disclosure. The invention is intended to be defined by the claims and to cover all corresponding and equivalent arrangements whether or not specifically disclosed herein.

We claim:

1. A friction stirred welding system of the type including a backing, said system comprising:
   a spindle;
   a rotating tool adapted to be accepted by the spindle, said spindle in use rotating the tool in contact with a workpiece to heat and weld the workpiece in solid state without causing the workpiece to melt;
   an electrically controlled actuator structured to determine the axial position of said tool in six degrees of freedom;
   a sensor that measures the downforce the rotating tool applies to said workpiece;
   a control system coupled to said sensor, said control system being structured to control said electrically controlled actuator to correct axial tool position at least in part in response to said measured downforce to thereby maintain the load between tolerance limits, said control system being further structured to avoid oscillations of the load applied to the workpiece by applying proportional integral derivative control to maintain the load constant or substantially constant during welding, said control system including a closed-loop control arrangement that controls rate of rotation of the tool;

a laser sensor that is adapted to be accepted by the spindle and interchangeable with said rotating tool, said laser sensor in use mapping the axial distance between the spindle and the backing;

an alarm coupled to the laser sensor, said alarm indicating if the axial distance between the tool and the backing is less than a predetermined threshold distance determined based at least in part on measured variations; and a data logger that logs welding parameters during welding.

2. The system of claim 1 wherein said laser sensor is structured to measure variations in axial distance between the spindle into which the tool is mounted and the backing onto which the workpiece is placed, and said control system uses said measured variations to correct axial tool position and avoid collision between said tool and the backing.

3. A method of performing friction stirred welding comprising:
(a) inserting a laser sensor into a friction stirred welding spindle;
(b) using the laser sensor to map the axial distance the friction stirred welding spindle is disposed from a backing surface; and
(c) removing said laser sensor from said spindle and inserting a tool in its place;
(d) rotating said tool;
(e) moving said rotating tool into contact with a workpiece placed on said backing surface; and
(f) using said map to control an electrically controlled actuator to correct axial tool position relative to said workpiece,
wherein said rotating tool in contact with said workpiece plasticizes portions of said workpiece while keeping said workpiece in the solid state, thereby welding said workpiece.

4. The method of claim 3 further including avoiding oscillations of the load applied to the workpiece by applying proportional integral derivative control to maintain downforce of said tool constant or substantially constant during welding.

5. The method of claim 3 wherein said mapping includes measuring variations in axial distance between a spindle into which the tool is mounted and a backing onto which the workpiece is placed, and using said measured variations to correct axial tool position and avoid collision between said tool and the backing.

6. The method of claim 3 further including generating an alarm if the axial distance between the tool and the backing is less than a predetermined threshold distance determined based at least in part on said measured variations.

7. The method of claim 3 further including automatically logging welding parameters during welding.

8. The method of claim 3 further including controlling rate of rotation of said tool using a closed loop control process.

9. A friction stirred welding method comprising:
inserting a laser sensor into a spindle;
controllably positioning the spindle while using the laser sensor to map the axial distance between the spindle and a backing;
removing the laser sensor from the spindle and inserting a rotatable tool in place of the laser sensor;
controlling the spindle to rotate the tool;
controlling the position of the spindle in six degrees of freedom to move the tool into contact with a workpiece to heat and weld the workpiece in solid state without causing the workpiece to melt;
measuring the downforce the rotating tool applies to said workpiece;
controlling the axial position of said tool in six degrees of at least in part in response to said measured downforce to thereby maintain the downforce within desired limits;
avoiding oscillations by applying proportional integral derivative control to maintain the downforce constant or substantially constant during welding; and
generating an alarm if the axial distance between the tool and the backing is less than a predetermined threshold distance determined based at least in part on the map.

* * * * *